(12) United States Patent
Fish

(10) Patent No.: US 6,199,159 B1
(45) Date of Patent: Mar. 6, 2001

(54) BOOTING AN OPERATING SYSTEM

(75) Inventor: Andrew J. Fish, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/218,951

(22) Filed: Dec. 22, 1998

(51) Int. Cl.[7] .................................................. G06F 9/445
(52) U.S. Cl. ........................................................... 713/2
(58) Field of Search ............................................ 713/1, 2

(56) References Cited

U.S. PATENT DOCUMENTS

| | | | |
|---|---|---|---|
| 4,787,031 | * 11/1988 | Karger et al. ................... | 709/100 |
| 5,136,711 | * 8/1992 | Hugard et al. ................... | 713/2 |
| 5,255,379 | * 10/1993 | Melo ................................ | 711/202 |
| 5,404,471 | * 4/1995 | Kawano et al. .................. | 712/207 |
| 5,644,755 | * 7/1997 | Wooten ............................ | 703/23 |
| 5,701,491 | * 12/1997 | Dunn et al. ...................... | 717/11 |
| 5,913,058 | * 6/1999 | Bonola ............................. | 713/2 |
| 5,978,882 | * 11/1999 | Adams ............................. | 711/2 |
| 6,021,425 | * 2/2000 | Waldrom, III et al. .......... | 709/103 |

* cited by examiner

Primary Examiner—Thomas M. Heckler
(74) Attorney, Agent, or Firm—Trop, Pruner & Hu, P.C.

(57) ABSTRACT

A method is used with a computer that is capable of searching for a first identifier. The first identifier is associated with a first loader that causes the computer to load a virtual mode operating system and not a real mode operating system. The method includes providing a second loader to load both the virtual mode operating system and the real mode operating system into a memory of the computer. A second identifier that is associated with the second loader is provided to identify the second loader as the first loader.

17 Claims, 4 Drawing Sheets

BOOTING AN OPERATING SYSTEM

BACKGROUND

The invention relates to booting an operating system.

Operating systems have continually evolved. For example, older computer systems (8086, 8088 or 80286 processor-based computer systems, as examples) use sixteen bit real mode operating systems, such as MS-DOS operating systems. However, these operating systems lack multitasking and memory management features provided by more recent thirty-two bit virtual mode operating systems (a Windows® 98 operating system, for example) that do not primarily execute programs in a real mode of a processor of the computer system.

Because some real mode programs (MS-DOS-based programs, for example) still require execution in the real mode, virtual mode operating systems may feature a virtual, real mode (a virtual 8086 mode, for example) in which a real mode operating system may cooperate with the thirty-two bit operating system to implement a real mode shell, such as an MS-DOS® shell. As an example, the virtual mode operating system may create a virtual DOS window to execute a real mode program and may multitask execution of this real mode program with other virtual mode programs.

For purposes of allowing the virtual and real mode operating systems to cooperate with each other, the computer system may initialize both operating systems when the computer system "boots up," such as when the computer system powers up or comes out of a hard reset. In this manner, at bootup, a basic input/output system (BIOS) may cause the computer system to copy a real mode operating system loader program (part of the real mode operating system) into a memory of the system. The BIOS may then cause the computer system to execute the loader program that, in turn, causes the computer system to load portions of the real mode operating system into the memory. Subsequently, the real mode operating system may execute one or more program(s) to initialize and start execution of the virtual mode operating system.

As operating systems continue to evolve, some of the backward compatibility with real mode operation may be lost. For example, it is quite possible that virtual operating systems in the future may not support booting up an auxiliary real mode operating system. In this manner, the operating system may include a loader program that loads only the virtual mode operating system and not the real mode operating system. More particularly, the BIOS may be designed to cause the computer system to search for and copy a virtual mode loader program into a memory of the computer system. This loader program, in turn, may cause the system to load only the virtual mode operating system. As a result, without the co-existence of the real mode operating system, real mode programs may not be supported.

Thus, there exists a continuing need for a mechanism to use a real mode operating system in conjunction with a virtual mode operating system when the BIOS does not support booting up the real mode operating system.

SUMMARY

In one embodiment, a method is used with a computer that is capable of searching for a first identifier. The first identifier is associated with a first loader that causes the computer to load a virtual mode operating system and not a real mode operating system. The method includes providing a second loader to load both the virtual mode operating system and the real mode operating system into a memory of the computer. A second identifier that is associated with the second loader is provided to identify the second loader as the first loader.

DETAILED DESCRIPTION

Figure 1:
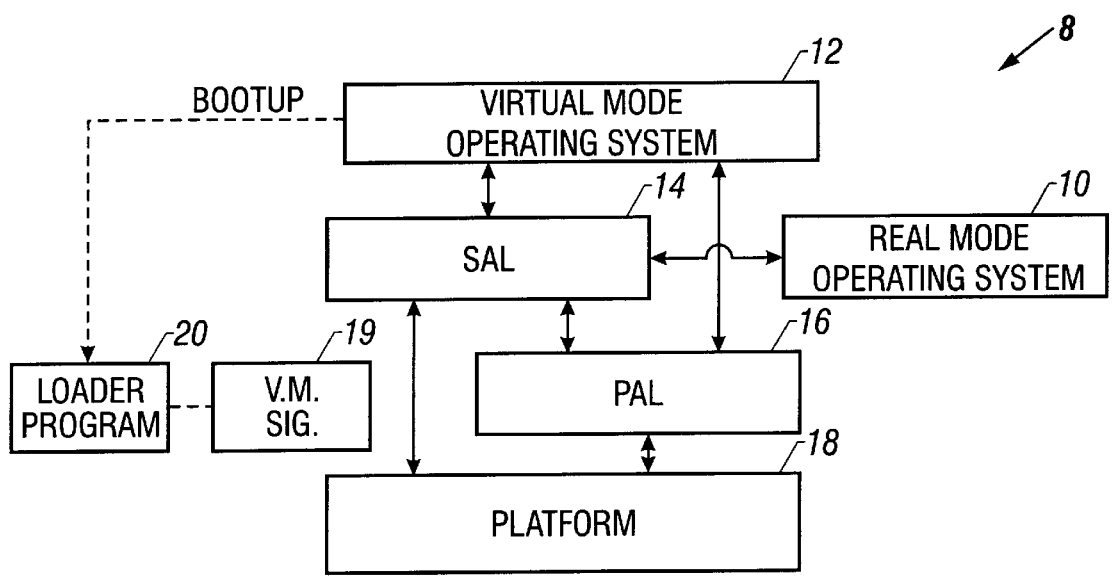
FIG. 1 is a block diagram of a software architecture of a computer system.

Referring to FIG. 1, an embodiment 8 of a software architecture of a computer system in accordance with the invention includes a virtual mode operating system 12 (a 64 bit operating system, for example), a software abstraction layer (SAL) 14 and a processor abstraction layer (PAL) 16. The SAL 14 is a platform specific firmware component that may be provided, for example, by original equipment manufacturers (OEMs) and system software vendors. The SAL 14 is similar to a basic input/output (BIOS) in that the SAL 14 is a firmware layer that isolates the operating system 12 and other higher level software from implementation differences in a hardware platform 18 of the computer system. The PAL 16 is a firmware layer that encapsulates all processor specific hardware and abstracts the processor implementation of the computer system.

During bootup of the computer system, the SAL 14 interacts with the operating system 12 (stored on a bootup device, such as a hard disk drive, for example) to load portions of the operating system 12 into a memory (of the computer system). Although the SAL 14 may support function calls to a real mode operating system 10, neither the SAL 14 nor the virtual mode operating system 12 supports bootup of the real mode operating system 10. In this manner, upon bootup, the SAL 14 causes the computer system to search for a loader program that is associated with loading the virtual mode operating system 12 only. Unlike typical systems, the software architecture 8 provides a virtual mode signature 19, or identifier, that identifies a loader program 20 as being a loader program for loading the virtual mode operating system 12 only. However, the loader program 20 actually causes the computer system to load both the virtual 12 and real 10 mode operating systems in a manner (described below) that is transparent to the SAL 14 and the virtual mode operating system 12.

Figure 2:
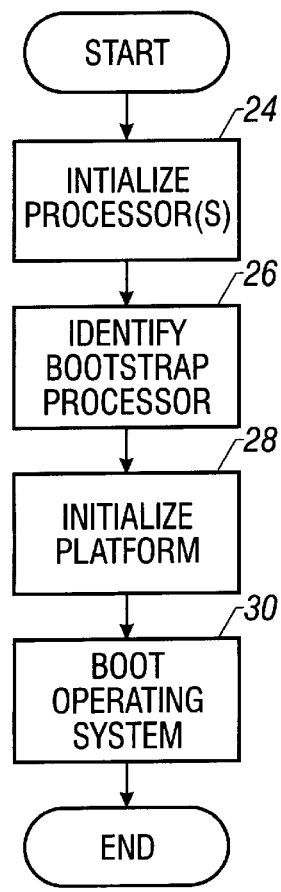
FIG. 2 is a flow diagram illustrating a boot sequence for the computer system of FIG. 1.

In the bootup of the computer system, the SAL 14 is responsible for performing platform tests and initialization, loading the first level of the operating system loader and jumping to it. In this manner, referring to FIG. 2, the SAL 14 first initializes (block 24) the processor(s) of the system, identifies (block 26) the bootstrap processor, initializes (block 28) the platform hardware 18 and subsequently, boots (block 30) the operating system during a bootup phase, described below.

Figure 3:
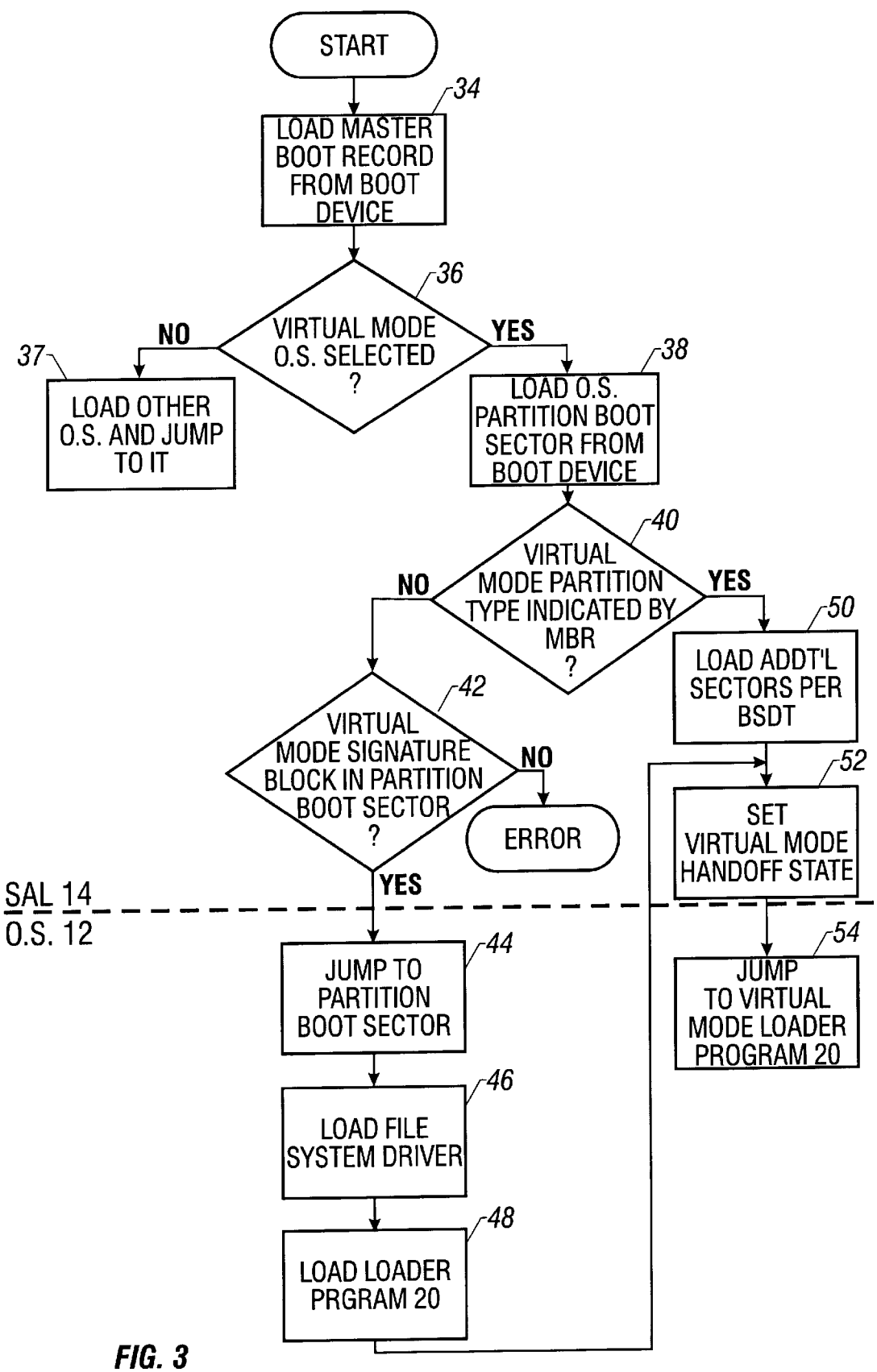
FIG. 3 is a flow diagram illustrating an operating system boot phase of the boot sequence.

Referring to FIG. 3, the bootup phase involves an interaction between the SAL 14 and the virtual mode operating system 12. In this manner, the SAL 14 causes the bootstrap processor to load (block 34) a master boot record (MBR)

from a bootup device (a hard disk drive, for example). Subsequently, the SAL 14 causes the bootstrap processor to determine (diamond 36) whether the virtual mode operating system 12 was selected, as indicated by the master boot record. If not, then the SAL 14 may interact with the operating system 12 to load (block 37) another operating system, such as a 32 bit operating system (a Windows® 95 operating system, for example). Otherwise, if the user selected the virtual mode operating system 12, the SAL 14 causes the bootstrap processor to load (block 38) an operating system partition boot sector from the bootup device and determine (diamond 40) whether the virtual mode partition type is indicated by the MBR.

If not, then the SAL 14 causes the boot processor to determine (diamond 42) whether a virtual mode signature (such as the signature 19) is indicated in the partition boot sector. If not, then the SAL 14 causes the bootstrap processor to indicate an error. Otherwise, the control of the bootstrap processor transitions to the operating system 12 which causes the bootstrap processor to jump (block 44) to execution of the partition boot sector code and subsequently load (block 46) a file system driver. Next, the operating system 12 causes the bootstrap processor to load (block 48) the loader program code 20. The operating system 12 then causes the bootstrap processor to set (block 52) a virtual mode operating system handoff state and jump (block 54) to the execution of the loader program 20.

If the bootstrap processor determines (diamond 40) that the partition type indicated by the master boot record indicates the virtual mode partition type, then the SAL 14 causes the bootstrap processor to load (block 50) additional sectors in accordance with a boot sector descriptor table. Subsequently, the SAL 14 causes the bootstrap processor to transition to block 52 and proceed as described above.

Figure 4:
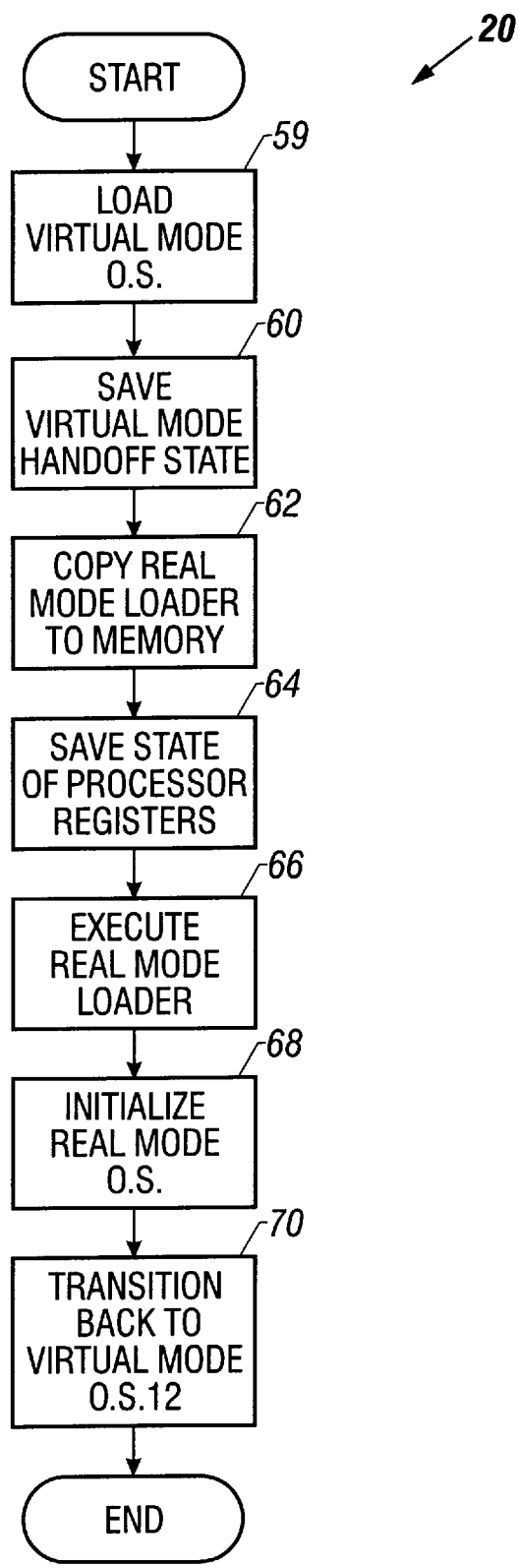
FIG. 4 is a flow diagram illustrating a loader program to load both virtual and real mode operation systems.

Referring to FIG. 4, the loader program 20, in some embodiments, may cause the bootstrap processor to load (block 59) the virtual mode operating system 12 into a memory of the computer system and subsequently, save (block 60) a state of the computer system called the virtual mode handoff state. Next, the loader program 20 may cause the bootstrap processor to copy (block 62) a loader for the real mode operating system 10 to the memory and save (block 64) the state of the bootstrap processors' registers. Next, the loader program 20 may cause the bootstrap processor to execute (block 66) a loader to load portions of the real mode operating system 10 into a memory. Subsequently, the loader program 20 may cause the bootstrap processor to initialize (block 68) the real mode operating system 10. Eventually, the loader program 20 causes the computer system to transition (block 70) control back to the virtual mode operating system 12.

The SAL 14 has the capability to make real mode calls to the real mode operating system 10 as a result of the SAL's ability to perform real mode functions when another operating system, other than the virtual mode operating system 12, is loaded into the computer system. For example, a 32-bit operating system, such as Windows 95® may be alternatively loaded into the computer system instead of the virtual mode operating system 12. Because the other operating system has the capability of running virtual DOS shells, the SAL 14 has the ability to execute DOS functions that are real mode functions. Thus, the ability of the real mode operating system 10 to co-exist with the virtual mode operating system 12 may rely on the function calls already present in the SAL 14.

In this manner, the loader program 20 (along with the virtual mode signature 19) may be used to load both the virtual mode operating system 12 and the real mode operating system 10 into the computer system. Calls may be made by the SAL 14 to evaluate performance of the virtual mode operating system 12, for example.

Figure 5:
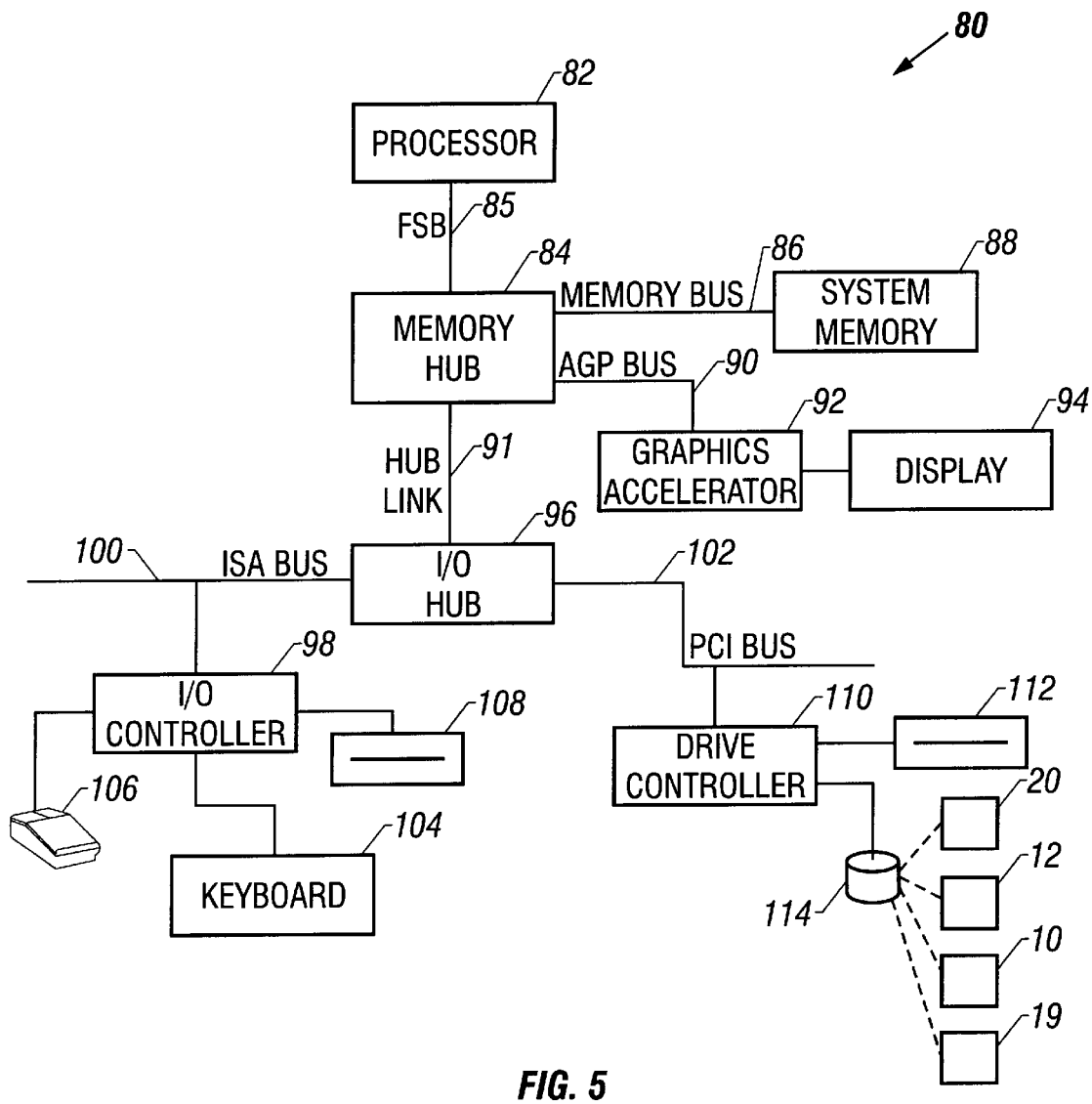
FIG. 5 is a schematic diagram of the computer system.

Referring to FIG. 5, an exemplary computer system 80 that may implement the software architecture 8 may include a processor 82 that communicates to the rest of the system 80 via a north bridge circuit called a memory hub 84. In some embodiments, the processor 82 may serve as the bootstrap processor and may execute the real 10 and virtual 12 mode operating systems. Besides providing a front side bus (FSB) 85 to the processor 82, the memory hub 84 may also provide an interface to a memory bus 86, an Accelerated Graphics Port (AGP) bus 90 and a hub link 91. The AGP is described in detail in the Accelerated Graphics Port Interface Specification, Revision 1.0, published on Jul. 31, 1996, by Intel Corporation of Santa, Clara, Calif. A system memory 88 may be coupled to the memory bus 86, and a graphics accelerator 92 may be coupled to the AGP bus 90. The graphics accelerator 92 furnishes signals to control a display 94.

The memory hub 84 may communicate with a south bridge circuit, or input/output (I/O) hub 96, via the hub link 91. The I/O hub 96 may provide an interface to an I/O expansion bus 100 and a Peripheral Component Interconnect (PCI) bus 102, as examples. The PCI Specification is available from The PCI Special Interest Group, Portland, Oreg. 97214. An I/O controller 98 is coupled to the I/O expansion bus 100 and receives input from a mouse 106 and a keyboard 104. The I/O controller 98 may also control operations of a floppy disk drive 108. A drive controller 110 may be coupled to the PCI bus 102 and may control operations of a compact disk-read only memory (CD-ROM) drive 112 and a hard disk drive 114, as examples. The loader program 20, the virtual mode operating system 12, the signature 19 and the real mode operating system 10 may be stored on the hard disk drive 114. In this manner, the hard disk drive 114 may serve as the bootup device.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for use with a computer capable of searching for a first identifier associated with a first loader that causes the computer to load a virtual mode operating system and not a real mode operating system, comprising:

providing a second loader to load both the virtual mode operating system and the real mode operating system into a memory of the computer; and providing a second identifier associated with the second loader to identify the second loader as the first loader.

2. The method of claim 1, further comprising providing the virtual mode operating system.

3. The method of claim 1, wherein the act of providing the second loader comprises storing the first loader on a computer readable storage medium.

4. The method of claim 1, wherein the identifier further indicates that the second loader is capable of loading only the virtual mode operating system.

5. The method of claim 1, further comprising:

transferring the second loader and the identifier to a disk drive.

6. A method for use with a computer capable of searching for a first identifier associated with a first loader that causes the computer to load a virtual mode operating system and not a real mode operating system, comprising:

storing a second loader to load both the virtual mode operating system and the real mode operating system into a memory of the computer; and storing a second identifier associated with the second loader to identify the second loader as the first loader.

7. The method of claim 6, further comprising:

storing the virtual mode operating system.

8. The method of claim 6, wherein the act of storing the second loader comprises storing the second loader on a computer readable storage medium.

9. The method of claim 6, wherein the identifier further indicates that the second loader is capable of loading only the virtual mode operating system.

10. The method of claim 6, wherein the act of storing the second loader comprises storing the second loader on a computer readable storage medium.

11. An article comprising a computer readable storage medium comprising instructions to cause a computer to:

indicate that the instructions are capable of loading the virtual mode operating system and not the real mode operating system; and load both the virtual mode operating system and the real mode operating system into a memory of a computer.

12. The article of claim 11, including instructions to cause the computer to execute the virtual mode operating system.

13. A computer system comprising:

a memory;

a processor to execute a virtual mode operating system and a real mode operating system; and a mass storage device to store:

a loader to cause the processor to load both the virtual mode operating system and the real mode operating system into the memory, and an identifier associated with the loader to indicate that the loader is capable of loading the virtual mode operating system.

14. The computer system of claim 13, wherein the mass storage device further stores the virtual mode operating system.

15. The computer system of claim 13, wherein the identifier further indicates that the loader is capable of loading only the virtual mode operating system.

16. The computer system of claim 13, wherein the mass storage device comprises a hard disk drive.

17. The computer system of claim 13, wherein the mass storage device further stores the real mode operating system.

\* \* \* \* \*